United States Patent [19]

Munakata et al.

[11] Patent Number: 4,555,380

[45] Date of Patent: Nov. 26, 1985

[54] AIR-PRESSURE METHOD

[75] Inventors: Shunsaku Munakata, Kawagoe; Hitoshi Ukai, Niiza; Mitsuru Noguchi, Tsurugashima; Shinichi Sawai, Kunitachi, all of Japan

[73] Assignees: Honda Giken Kogyo Kabushiki Kaisha, Tokyo; Tokyo Seat Co., Ltd., Asaka, both of Japan

[21] Appl. No.: 620,599

[22] Filed: Jun. 14, 1984

[30] Foreign Application Priority Data

Jun. 16, 1983 [JP] Japan .................................. 58-108992

[51] Int. Cl.$^4$ ............................................. B29C 17/04
[52] U.S. Cl. ..................... 264/510; 264/547; 425/387.1
[58] Field of Search ............. 264/510, 512, 514, 544, 264/547, 553; 425/387.1

[56] References Cited

U.S. PATENT DOCUMENTS

| | | | |
|---|---|---|---|
| 2,973,558 | 3/1961 | Stratton, Jr. ........................ | 264/549 |
| 3,234,065 | 2/1966 | Best ................................... | 264/512 X |
| 3,260,781 | 7/1966 | Lux et al. .......................... | 264/512 X |
| 3,441,983 | 5/1969 | Cheney .............................. | 264/547 X |
| 4,036,675 | 7/1977 | Amberg et al. ................... | 264/512 X |
| 4,057,382 | 11/1977 | Yamamori ......................... | 425/387.1 |

*Primary Examiner*—Jan Silbaugh
*Attorney, Agent, or Firm*—Armstrong, Nikaido, Marmelstein & Kubovcik

[57] ABSTRACT

In the air-pressure molding method according to the present invention, a laminated material is arranged, when in a heated and softened state, on the shaping face of a mold having an air reservoir, and the portion to be molded is hermetically sealed within a box-shaped top cover. Air under pressure higher than atmospheric pressure is then applied to the inside of the top cover so that the laminated material is developed and shaped to have a uniform thickness on the air-cushion layer which is established by the air pressure between the laminated material and the shaping face of the mold. Immediately after, the air in the cushion layer is forced to the air reservoir thereby bringing the laminated material into contact with the mold so that the surface of the skin may be reversely embossed or stitched.

6 Claims, 5 Drawing Figures

AIR-PRESSURE METHOD

BACKGROUND OF THE INVENTION

The present invention relates to an air-pressure molding method which is suitable for producing a vehicular door inner trim or the like comprising a shaped sheet of laminated material having a foamed resin layer as its intermediate layer.

When a vehicular door inner trim or the like is produced, according to the prior art, both a base material made of a thermoplastic resin or the like and a skin material having an integrated foamed resin layer, acting as a cushioning material are used and are so shaped and molded in advance at different steps such that they may be fitted together in the shape of the door inner trim with a foamed resin layer interposed therebetween. However, this prior art method includes the steps of shaping and molding the respective materials separately and adhering them to each other. The method thus, has a large number of steps and requires much time and work so that the production efficiency is poor.

In order to eliminate this defect, it is sufficient to shape and mold a sheet of laminated material in one step where the sheet is prepared in advance by laminating and overlying a base material and a skin material while sandwiching a foamed resin layer therebetween. However, if the laminated material is press-molded, the intermediate foamed resin layer is crushed and thus, has its cushioning performance deteriorated. If the same material is vacuum-molded, on the other hand, the intermediate foamed resin layer peels and separates from the base material and the skin material.

The applicant herein has separately proposed an air-pressure molding method which can ideally mold the aforementioned laminated material. An air-pressure molding method is provided in which the laminated material is arranged in its heated and softened state on the shaping face of a mold, and then, the portion of the laminated material to be molded is confined and hermetically sealed by a box-shaped top cover which is adapted to be moved downward. In the sealed state, the inside of the top cover is supplied, from an air pipe, with air at an air pressure higher than atmospheric pressure so that the laminated material portion is forced downward into contact with the shaping face of the mold until it is shaped and molded. In this air-pressure molding operation, air pressure can be uniformly applied downward to the entire surface of the portion of the laminated material to be molded, so that the laminated material portion can be shaped and molded to have a uniform thickness without breaking the foamed resin layer. However, the air residing between the laminated material and the shaping face of the mold forms a thin, uniform air cushion layer so that the laminated material is not forced into close contact with the shaping face of the mold. Therefore, the described air-pressure molding method is not suitable when the skin material is to have a surface which is embossed or stitched by bringing it into contact with the mold surface. If the air between the laminated material and the shaping face of the mold is merely released to the outside of the mold so as to emboss or stitch the skin surface, the laminated material is undesirably thickened especially where there is large develop- ment.

SUMMARY OF THE INVENTION

It is the primary object of the present invention to provide an air-pressure molding method which produces a laminated material having a uniform thickness and which is embossed or stitched.

In the air-pressure molding method according to the present invention, a laminated material is arranged, when in a heated and softened state, on the shaping face of a mold having an air reservoir, and the portion to be molded is hermetically confined with a box-shaped top cover. An air pressure higher than atmospheric pressure is then applied to the inside of the top cover so that the laminated material is developed and shaped, with a uniform thickness, on the air-cushion layer which is established by that air pressure between the laminated material and the shaping face of the mold. Immediately after, the air in the cushion layer is forced to the air reservoir thereby bringing the laminated material into contact with the mold so that the surface of the skin of the laminated material may be reversely embossed or stitched.

DETAILED DESCRIPTION OF THE PREFERRED EMBODIMENT

Figure 1:
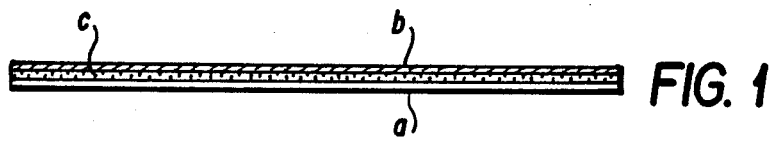
FIG. 1 illustrates the laminated material which is shaped and molded by the air-pressure molding method according to the present invention.
Figure 2:
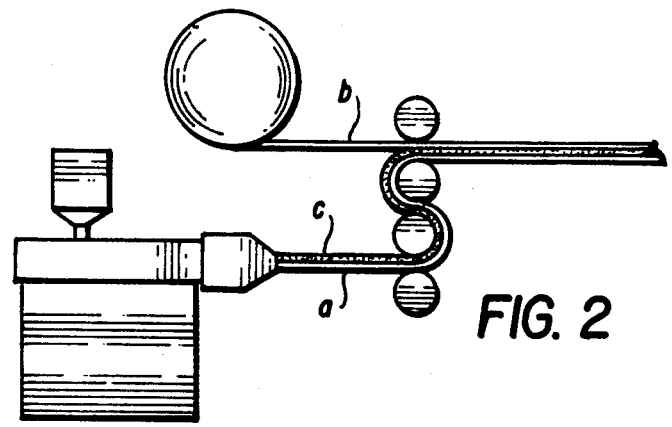
FIG. 2 illustrates the preparation of the laminated material shown in FIG. 1.

The preferred embodiment of the present invention is directed to the production of a vehicular door inner trim. A sheet of laminated material is used which, as shown in FIG. 1, is composed of at least three layers, a skin a, a base material b and an intervening foamed resin layer c therebetween. The skin material a may be made of PVC (polyvinyl chloride), TPE (thermoplastic elastomer), or other thermoplastic resin or a sheet material of fabric. The base material b may be made of boat-shaped material of a thermoplastic material such as PP (polypropylene), woodmeal or a mixture of PP and woodmeal because it is suitable for recycling and it is light. The foamed resin layer c may be made of a foamed material of polyolefin which has a foaming ratio of 3 to 50 so as to form the cushion layer and, preferably, a foaming ratio of 15 to 20, which provides excellent strength and cushioning characteristics. When the three layers are to be laminated, they can be simultaneously adhered, as shown in FIG. 2, by foaming and continuously applying the layer c to the skin material a and by contactbonding the foamed resin layer c in a preheated state of about 180° C. to the base material b. The laminated materials may be composed of 0.2 to 0.6 millimeter of the skin a, 0.8 to 3.0 millimeter of the base material b and 2.0 to 4.0 millimeter of the foamed layer c.

Figure 3:
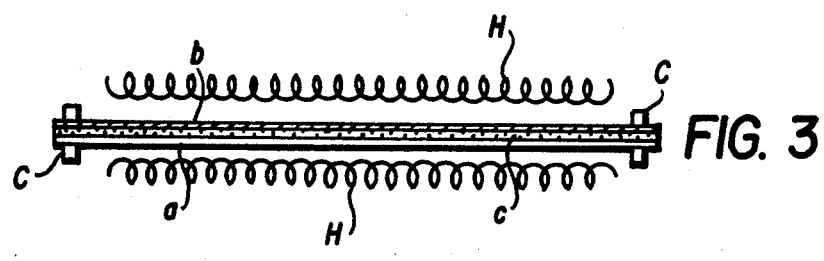
FIG. 3 illustrates the heating step of the present invention.

The sheet of laminated material is heated and softened after it has been cut to have an area corresponding to the size of the vehicular door inner trim. This heating and softening treatment may be conducted by clamping the periphery of the laminated material by means of a clamp C and by heating it with a heater H, as shown in FIG. 3. The heating temperature is in a range of about 250° to 350° C. The laminated material thus heated and softened is then arranged on the shaping face of a mold M, as shown in FIG. 4a.

Figure 4A:
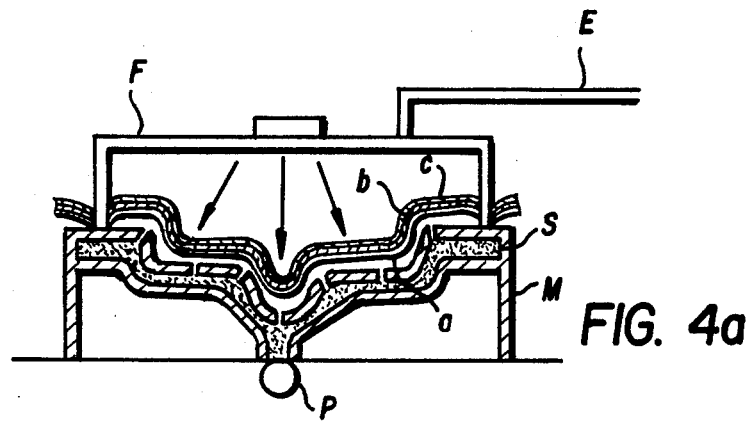
FIGS. 4a and 4b illustrate the air-pressure molding steps according to the present invention.
Figure 4B:
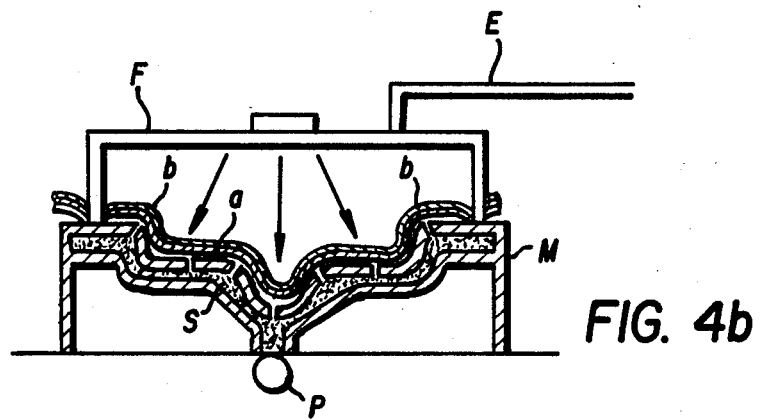

The mold M, as shown in FIGS. 4a and 4b is a female mold which has an air reservoir S. This air reservoir S can be formed of a porous layer with fine pores by burying a granular aluminum. Also, the air reservoir S may be formed in the body of the mold M having a connection through air vent holes, as in the shown embodiment. Alternatively, the shaping face of the mold M may be formed of a porous layer. The air reservoir may also be formed by forming a number of fine air vent holes in the body of the mold M. The shaping face of the mold M is formed with relief patterns which correspond to the resultant embossed or stitched patterns.

The laminated material thus formed has its skin material a facing the shaping face of the mold M. At this time, the laminated material is desirably held under tension by clamping its periphery by means of the clamp C so that it does not extend into the recess of the female mold M. A box-shaped top cover F is arranged in contact with that laminated material to hermetically confine the portion of the laminated material to be molded. The top cover F is adapted to be moved up and down by the action of a cylinder (not shown) so that its flanged portion is brought into contact with the laminated material on the mold M to thereby hermetically confine the periphery of the portion of the laminated material. After the portion of the laminated material to be shaped is hermetically confined within the top cover F, an air pressure higher than the atmospheric pressure is applied to the inside of the top cover F through an air pipe E connected to the top cover F, as shown in FIG. 4b. The air pressure may be selected from a pressure range of 1.1 to 10 atms and may preferably be set at 2 to 3 atms and is applied for about 10 secs. Under this pressure, the laminated material is brought into near contact with the shaping face of the mold M so that the air confined between the laminated material and the shaping face of the mold M establishes an air cushion layer in accordance with the downward movement to develop and form the laminated material into a uniform thickness. The temperature of the laminated material is such that the material is soft enough that it will conform to the shape of the shaping face of the mold M. The temparature of the laminated material at the time the air is withdrawn from the space between the laminated material and the mold surface in the prefered embodiment of the present invention is as follows:

EXAMPLE (1)

In the case the PVC (polyvinyl chloride) and PP (polypropylene) are used as skin material and base material respectively.

| Material used | Temperature when the air is withdrawn |
|---|---|
| Skin Material . . . PVC (polyvinyl chloride) | 140–150° |
| Base Material . . . PP (polypropylene) | around 160° |

EXAMPLE (2)

In the case that PVC and PE (polyethlene) are used as skin material and base material respectively.

| Material used | Temperature when the air is withdrawn |
|---|---|
| Skin Material . . . PVC | 140–150° |
| Base Material . . . PE (polyethylene) | around 140° |

EXAMPLE (3)

In the case that PVC and ABC (acrylonitrile-butadiene -styrene) are used as skin material and base material respectively.

| Material used | Temperature when the air is withdrawn |
|---|---|
| Skin Material . . . PVC | 140–150° |
| Base Material . . . ABC (acrylonitrile-butadiene-styrene) | around 170° |

The air in the air cushion layer migrates into the air reservoir S to bring the laminated material into contact with the shaping face of the mold M. As a result, the laminated material is forced to have a uniform thickness in its entirety, and the skin material can have its surface embossed or stitched by means of relief patterns. After the air-pressure molding operation, the air is released from the air reservoir S to the outside of the mold M by the action of a pump P, and the top cover F is lifted to release the confined state so that the resultant molding can be taken out of the mold M. When the mold M is to be parted, the top cover F is opened gradually over about 110 secs so that the molded material may be cooled naturally. If the molded material is cooled too rapidly, the molded material may be undesirably deformed.

If the laminated material is shaped and molded in the manner thus described, the intermediate foamed resin layer c is neither crushed nor broken because the air pressure is applied to the laminated material from the side of its base material b to thereby bring the skin material a into contact with the shaping face of the mold M. Moreover, even if the foamed resin layer c is heated and softened, the foam is not crushed so that the excellent cushioning performance can be maintained, because the laminated material is pushed by the air pressure. Further, the molded material has a uniform thickness because it has been uniformly exposed to the air pressure over its entire surface. Furthermore, the skin material a can have its surface formed with relief patterns such as embossed or stitched patterns.

Thus, according to the air-pressure molding method of the present invention, the intermediate foamed resin layer C retains its excellent cushioning characteristics without being broken or crushed, and the laminated material may have a surface shaped and molded with embossed or stitched patterns having accurate relief shapes corresponding to the shaping face of the mold.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A method of shaping a laminated sheet material formed from a base material, a skin material and a foamed resin layer therebetween, said method comprising the steps of:
(a) heating said laminated sheet material;
(b) positioning said heated, laminated sheet adjacent to a mold surface;
(c) placing a cover means over at least a portion of said laminated sheet adjacent said mold surface;
(d) forming a hermetic seal between said laminated sheet and said cover means, thereby defining a hermetically sealed space therebetween;
(e) increasing the air pressure in said hermetically sealed space to a pressure above atmospheric pressure and establishing an air cushion layer between the laminated material and the surface of the mold from the air residing therebetween such that said at least portion of said laminated sheet takes a shape in substantial uniform thickness corresponding to said mold surface; and, thereafter,
(f) forcing the air from between said laminated sheet and said mold surface before the said laminated sheet is cooled substantially such that said at least a portion of said laminated sheet contacts said mold surface and conforms to the shape of the face of the mold.

2. The method of claim 1, wherein the air pressure in said hermetically sealed space is increased to 1.1 to 10 atms.

3. The method of claim 2, wherein the air pressure in said hermetically sealed space is increased to 2 to 3 atms.

4. The method of claim 2, wherein the air pressure in said hermetically sealed space is increased for a period of 10 secs.

5. The method of claim 1, wherein the pressure in said space is gradually reduced to atmospheric pressure after the laminated sheet contacts the mold surface.

6. The method of claim 5, wherein the gradual reduction to atmospheric pressure lasts 110 seconds.

* * * * *